United States Patent [19]
Cates et al.

[11] Patent Number: 5,512,123
[45] Date of Patent: Apr. 30, 1996

[54] METHOD FOR USING PULSED OPTICAL ENERGY TO INCREASE THE BONDABILITY OF A SURFACE

[75] Inventors: Michael C. Cates, Del Mar; Richard R. Hamm; Edmond Chu, both of San Diego, all of Calif.

[73] Assignee: Maxwell Laboratories, San Diego, Calif.

[21] Appl. No.: 300,389

[22] Filed: Sep. 2, 1994

Related U.S. Application Data

[63] Continuation-in-part of Ser. No. 156,355, Nov. 23, 1993, abandoned, which is a continuation of Ser. No. 885,728, May 19, 1992, abandoned.

[51] Int. Cl.$^6$ ................................................. B32B 31/00
[52] U.S. Cl. ................ 156/272.6; 156/281; 156/273.3; 156/376.6; 156/497; 156/285; 156/382
[58] Field of Search ................................ 156/281, 272.6, 156/273.3, 379.6, 497, 285, 382

[56] References Cited

U.S. PATENT DOCUMENTS

| | | | |
|---|---|---|---|
| 3,700,950 | 10/1972 | Lumley et al. | 219/121 |
| 3,986,391 | 10/1976 | Vahaviolos | 219/121 |
| 4,249,956 | 2/1981 | Hartman | 134/7 |
| 4,398,961 | 8/1983 | Mason | 134/19 |
| 4,419,562 | 12/1983 | Jon et al. | 219/130 |
| 4,491,484 | 1/1985 | Williams | 134/4 |
| 4,504,727 | 3/1985 | Melcher et al. | 219/121 |
| 4,543,486 | 9/1985 | Rose | 250/492 |
| 4,588,885 | 5/1986 | Lovoi et al. | 250/226 |
| 4,650,535 | 4/1992 | Bennett et al. | 156/358 |
| 4,682,594 | 7/1987 | Mok | 128/303 |
| 4,717,516 | 1/1988 | Isaka et al. | 156/272.6 |
| 4,718,974 | 1/1988 | Minaee | 156/643 |
| 4,731,125 | 3/1988 | Carr | 134/17 |
| 4,737,628 | 4/1988 | Lovoi | 250/226 |
| 4,756,765 | 7/1988 | Woodroffe | 134/1 |
| 4,803,021 | 2/1989 | Werth et al. | 264/25 |
| 4,836,858 | 6/1989 | Reinhart | 134/1 |
| 4,867,796 | 9/1989 | Asmus et al. | 131/1 |
| 4,947,592 | 8/1990 | Lloyd et al. | 51/436 |
| 4,994,639 | 2/1991 | Dickinson et al. | 219/121 |

(List continued on next page.)

OTHER PUBLICATIONS

Klauser, H. E., "Closed–Loop Laser Control System", *IBM Technical Disclosure Bulletin*, 24(9), (Feb. 1882).

Yaeck, C. E., et al., "Transient Photoacoustic Monitoring of Pulse Laser Drilling", *Appl. Phys. Lett.*, 41(11), (Dec. 1, 1982).

Schmitz, W. N., "Xenon Flashlamp/$CP_2$ Pellet Blasting or Paint Stripping/Coatings Removal", *Proceedings of the DOD/Industry Advanced Coatings Removal Concerence*, San Diego, CA (Apr. 1930/May 2, 1991).

Cates, M. C., "Modeling of the Flashblast Coating Removal Process", *Proceedings of the DOD/Industry Advanced Coatings Removal Conference*, San Diego, CA (Apr. 30–May 2, 1991).

*Primary Examiner*—Chester T. Barry
*Attorney, Agent, or Firm*—Fitch, Even, Tabin & Flannery

[57] ABSTRACT

A method and system for improving the capability of a surface of an organic structure to bond with another material includes irradiating a target area of the surface of a structure with pulsed, incoherent optical energy having wavelength components which range from 160–5000 nanometers at an intensity sufficient to photodecompose any adventitious organic substances on the surface and to photodecompose a thin layer of molecular bonds forming the surface of the structure; and exposing the target area of the surface to ionized gas that chemically reacts with the target area of the surface to increase the surface free energy of the surface. A similar method and system may also be employed to improve the bondability of a metallic surface by first pre-cleaning the metallic surface to dislodge any inorganic substances from the surface; and second irradiating a target area of the surface with pulsed, incoherent optical energy having wavelength components in the range of 160–5000 nanometers at an intensity sufficient to photodecompose any organic substances present on the surface.

18 Claims, 2 Drawing Sheets

U.S. PATENT DOCUMENTS

| | | | |
|---|---|---|---|
| 5,013,366 | 5/1991 | Jackson et al. | 134/1 |
| 5,024,968 | 6/1991 | Engelsberg | 437/173 |
| 5,063,015 | 11/1991 | Lloyd et al. | 51/320 |
| 5,109,636 | 5/1992 | Lloyd et al. | 51/320 |
| 5,126,621 | 6/1992 | Morton et al. | 313/237 |
| 5,194,723 | 3/1993 | Cates | 250/205 |
| 5,236,512 | 8/1993 | Rogers et al. | 134/1 |

METHOD FOR USING PULSED OPTICAL ENERGY TO INCREASE THE BONDABILITY OF A SURFACE

This application is a continuation-in-part of application Ser. No. 08/156,355, filed Nov. 23, 1993; now abandoned which was a continuation of application Ser. No. 07/885,728, filed May 19, 1992 now abandoned.

BACKGROUND OF THE INVENTION

The present invention relates to optical surface preparation techniques, and more particularly, to improving the capability of the surface of a structure to bond with a material or the surface of another structure by irradiating one or both surfaces with incoherent, pulsed optical energy having a broadband energy spectrum.

There are many applications for which it is desirable to bond one material to another. In the automotive industry, for example, polymeric outer body panels are often bonded to metal subpanels to improve aesthetics. In the defense industry, composite structures bonded to each other are used routinely for weight reduction. In the aircraft industry, the exterior surface of airplanes must be painted to prevent corrosion that could otherwise weaken the airplane structure. Good bond strength between materials depends to a large extent on appropriate surface preparation. Surface preparation techniques which enhance the capability of the surface of a structure to bond with a material (bondability) include solvent cleaning, abrading, and/or chemical treatment. However, these methods are all characterized by potential toxic chemical hazards, waste disposal problems, and high production costs.

All surface preparation techniques generally increase the surface free energy of the surface. Surface free energy refers to the energy required to create a unit area of the surface. In the case of a liquid, the surface free energy is expressed by the surface tension coefficient. Polar liquids, such as water, have high surface tension coefficients ($H_2O$=73 dynes/cm at 20° C.). For a liquid to wet a solid surface, the surface free energy of the solid surface must therefore be higher than that of the liquid. As a result, the ability to achieve a water break free surface (i.e., no beading) is often used as a criteria for adequate surface preparation.

Surface free energy of a solid surface can be improved by either removing all surface contaminants or by changing the surface chemistry. Removing all surface contaminants improves the surface free energy because, when exposed to the environment, a solid with inherently high surface free energy will attract contaminants as a way to reduce its total energy. As a result, the contaminated surface loses or reduces its ability to bond to other surfaces. Removal of the surface contaminants (which are typically organic materials) will restore the surface's inherent surface free energy. For example, metals such as aluminum can achieve a "water break free" condition when the surfaces are clean.

Removing surface contaminants does not always help, however, depending upon the type of material. Most organic materials (particularly those made up of large chains of molecules), for example, usually have low surface free energies regardless of the cleanliness of the surfaces. Hence, to increase the surface free energy, the surface molecular structures of such materials must be modified. For example, the surface affinity for other molecules can be increased by either breaking up the large molecular chains into smaller ones or by the insertion of other atoms into molecular chains at the surface.

Optically engineered surface preparation technology is a known alternative to solvent, abrasive, or chemical processes, and avoids some of the aforementioned problems. An example of one optical surface preparation technique is presented in Sowell, R. R., et al., "Surface Cleaning By Ultraviolet Radiation," J. Vac. Sci., Vol. 11, No 1, January/February 1974. The Sowell reference describes a process for removing hydrocarbon contaminants from metal and glass surfaces by irradiating such surfaces with generally steady-state Ultra-Violet (UV) radiation in the presence of a low pressure oxygen atmosphere or in open air. However, the process described by Sowell requires hours to complete due to the limited UV light intensity that can be obtained from a steady-state UV light source. Therefore, the Sowell process is generally not suitable for applications in which it is desirable to increase the bondability of surfaces, some of which may be very large, within a period of time which would make such processing practical.

U.S. Pat. No. 4,803,021, "Ultraviolet Laser Treating of Molded Surfaces," is directed to a method for preparing the surfaces of molded products to improve bonding and painting performance. Such method includes irradiating the coated surface of molded products with pulsed laser light that decomposes any mold-release agents present on the surface to yield diverse decomposition fragments within the irradiated zone. This process requires that the surface material be etched deeply enough to remove substantially all of the mold-release agent. A surface may only be subjected to this process a finite number of times in order to limit the amount of surface material removed by etching. Since molded plastic is generally released from a mold only once, the minimal amount of material removed by etching is tolerable and may be considered in the design of the such products. However, this process is not suitable for repeatedly treating surfaces as part of a scheduled maintenance program, as for example, where it is desired to prepare a surface for painting, if preservation of the surface is desired.

A significant problem with a laser based system, such as that described by the '021 patent, is that irradiation of large or topologically complex surfaces with the pinpoint beam of a laser is very difficult to achieve, requiring sophisticated scanning and rastering techniques. Furthermore, the operation of a laser requires laser stops to prevent the laser beam from inadvertently escaping the work area, and the building where the laser is operated. This is because lasers pose a serious danger to humans, who could be seriously injured if irradiated with a laser beam.

An even more significant problem with laser illumination, however, is controlling the intensity with which a laser beam irradiates a surface. Because the intensity of a laser beam does not follow the inverse square law, the energy density of the area or "footprint" irradiated by the laser beam is generally so high that the beam causes thermal decomposition of the materials at the surface being irradiated. If the structure being irradiated is made of a polymeric material, laser irradiation breaks up the thermal bonds of the molecules of the material, but then (due to the excessive influx of energy) causes the decomposed polymer bonds to recombine into new, and different polymer molecules. The formation of such new polymer molecules may actually cause a decrease in the surface free energy of the irradiated surface, causing the bondability of the surface to possibly decrease.

Thus, it may be appreciated that there is a need for a process which enhances the capability of the surface of one structure to be bonded to another. A further need exists for a cost effective method to increase the bondability of large or topologically complex surface areas. A still further need exists for a method to increase the bondability of a surface which does not require the use of toxic chemicals.

SUMMARY OF THE INVENTION

The aforementioned needs are met by the present invention which provides a method and system for increasing the capability of the surface of a structure to be bonded to a material.

One aspect of the present invention involves a method for improving the capability of the surface of a plastic (e.g. polyethylene, polypropylene, celcon, etc.) or composite (e.g. G10, carbon, etc.) structure to bond with another material. Such method comprises the steps of irradiating a target area of a surface of a structure with pulsed, incoherent optical energy having wavelength components which range from 160–5000 nanometers at an intensity sufficient to photodecompose any adventitious organic substances on the surface and to photodecompose a thin layer of molecular bonds forming the surface of the structure; and exposing the target area of the surface to ionized gas that reacts with the photodecomposed molecules of the target area of the surface so as to further increase the surface free energy of the surface.

Another aspect of the present invention provides a method for improving the capability of a metal surface to bond to a material. This method involves irradiating the target area of the surface with pulsed, incoherent optical energy having wavelength components in the range of 160–5000 nanometers at an intensity sufficient to photodecompose any organic substances on the surface. Prior to irradiating the surface with pulsed, incoherent optical energy, it is desirable to clean the surface in order to dislodge any gross inorganic contaminants present on the surface. Such cleaning may be accomplished in numerous ways, e.g., by mechanical brushing or wiping, or by impinging the target area with a stream of particles.

The present invention also provides a system for improving the capability of the surface of a structure manufactured of organic material to bond with a material. Such system includes: (1) an optical energy source for generating pulsed, incoherent, optical energy having wavelength components ranging from about 160–5000 nanometers directed to irradiate a target area on the surface of a structure so as to increase the surface free energy of the surface; (2) a pulse modulator operably coupled to control the output of the optical energy source; (3) an electrical power supply operably coupled to provide electrical energy to the pulse modulator. A source of ionized gas for bathing the irradiated target area in the ionized gas is desirable but not required for all materials.

Another embodiment of the invention provides a system for improving the capability of a metallic surface or similar surface with inherently high free surface energy to bond with a material. Such system comprises: (1) an optical energy source for generating pulsed, incoherent, optical energy having wavelength components ranging from about 160–5000 nanometers directed to irradiate the given surface cleaned by the particle stream so as to increase the surface free energy of the given surface; (2) a pulse modulator operably coupled to control the output of the optical energy source; and (3) an electrical power supply operably coupled to provide electrical energy to the pulse modulator. Removal of bulk contamination prior to irradiation by the pulsed, broad-banded optical energy source is desirable. Any mechanical means such as brushing or wiping will often be adequate.

An advantage of the system and method of the present invention is that it provides an economic and high throughput process for enhancing the capability of the surface of one structure to be bonded to another.

Another advantage of the present invention is that it provides a system and method for increasing the bondability of large or topologically complex surface areas.

Still a further advantage of the present invention is that a system and method are provided for increasing the bondability of a surface which does not require the use of toxic chemicals.

DESCRIPTION OF THE DRAWINGS

The above and other aspects, features and advantages of the present invention will be more apparent from the following more particular description thereof presented in conjunction with the following drawings, wherein.

Throughout the specification and various views of the drawings, like components are referred to with like reference numerals.

DESCRIPTION OF THE PREFERRED EMBODIMENTS

Figure 1:
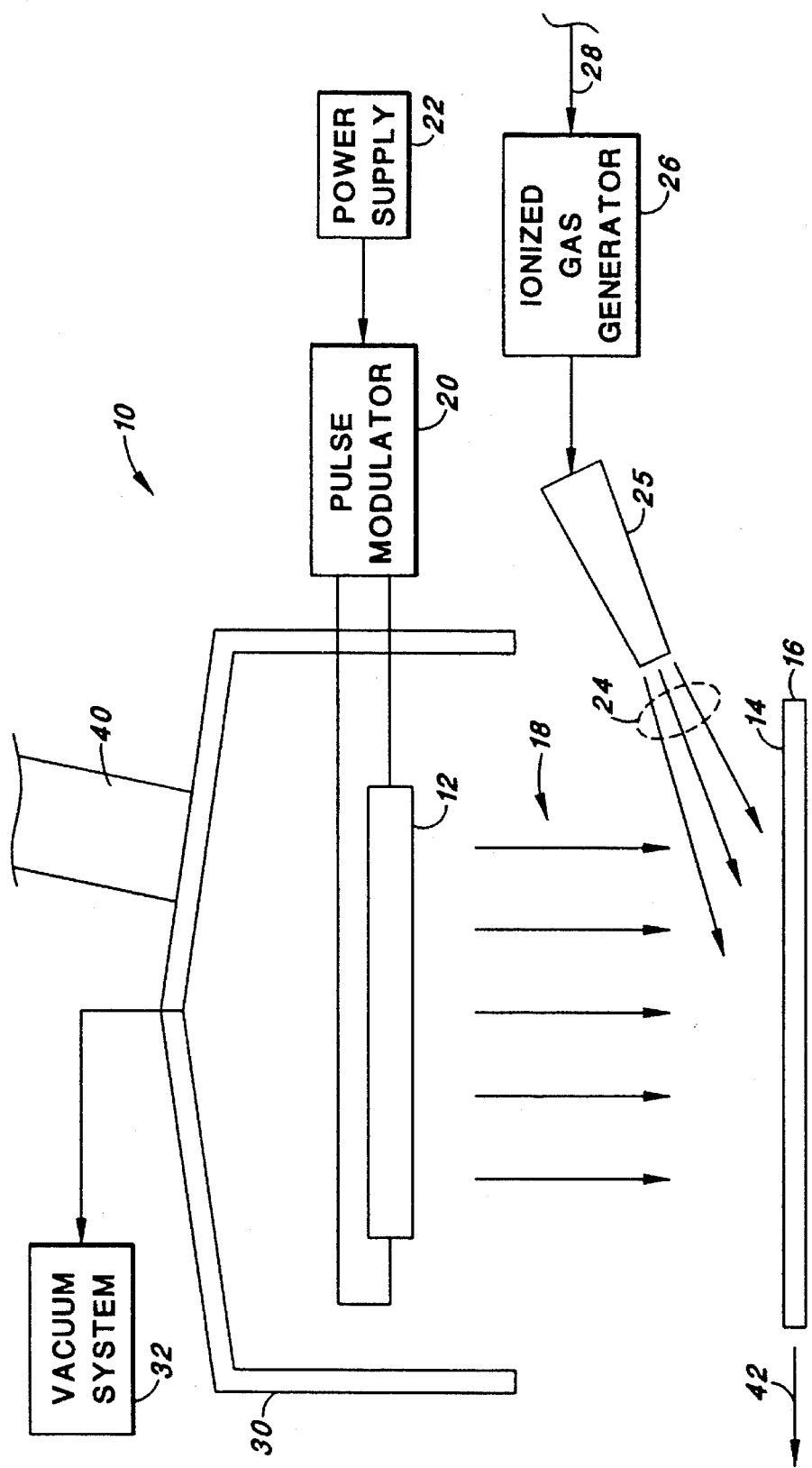
FIG. 1 is a schematic/block diagram of a system for increasing the bondability of a surface which employs a supporting structure to facilitate scanning the target area of the surface with optical energy.

The following description is of the best mode presently contemplated for carrying out the invention. This description is not to be taken in a limiting sense, but is made for the purpose of describing the general principles of the invention. The scope of the invention should be determined with reference to the claims.

The invention relates to a novel process for significantly improving the bondability of the surfaces of metal or organic structures. It is to be understood that throughout the description presented herein, the term "metal" refers generically to any materials having an inherently high free surface energy. It is also to be understood that the organic structures may include organic matrix composites, thermoset materials, and thermoplastic materials.

The method of the present invention involves irradiating a target area of the surface of interest with pulsed, broadband optical energy, which is preferably incoherent, while exposing the target area to an ionized gas. The broadband optical energy is optical energy having wavelength components ranging from about 160–5000 nanometers (nm). The pulsed optical energy photodecomposes any organic, adventitious materials present on the surface into gases which are transported away from the surface. In applications where the surface of the structure is made of polymeric materials, the optical energy photodecomposes, or breaks the bonds of the polymer chains of the molecules comprising the surface of the structure. This in turn initiates chemical reactions of the polymer chains with the surrounding gas and modifies the surface by introducing highly polar sites to the otherwise relatively non-polar molecules, thereby increasing the surface free energy of the surface. The following table (Table 1) lists the bond dissociation energies for some organic molecules of interest.

Table 1

Some Bond Dissociation Energies (Kcal/Mole at 25° C.)

TABLE 1

Some Bond Dissociation Energies (Kcal/Mole at 25° C.)

| Bond | Dissociation Energy |
|---|---|
| $CH_3CH_2$—H | 98 |
| $(CH_3)_2CH$—H | 94 |
| $(CH_3)_3C$—H | 90 |
| $C_6H_5CH_2$—H | 78 |
| $C_6H_5$—H | 102 |
| $CCl_3$—H | 90 |
| O=CH—H | 78 |

It should be noted that ultraviolet light at 200 nm has an energy of 143.2 kcal/mole, while even blue light at 400 nm has an energy of 71.6 kcal/mole. The energy of a quantum of light depends on its wavelength, $\lambda$, and it can be derived from a simple formula:

$$E(\text{in kcal/mole})=28,635/\lambda$$

where the wavelength $\lambda$ is expressed in nm.

The broadband optical energy provides electromagnetic spectrum components of which at least some have high probabilities of being absorbed to photodecompose the chemical bonds of the many different types of organic materials that may be found on a surface being processed, either as contaminants, or comprising the surface itself. In other words, using a source of broadband optical energy increases the probability that such energy will overlap an optical absorption peak of the material being irradiated.

A system 10 for increasing the surface free energy of an organic surface, and particularly a polymeric surface, is described with reference to FIG. 1. As seen in FIG. 1, an optical energy source 12 irradiates a target area on a surface 14 of a substrate 16 with incoherent, pulsed, broadband optical energy 18. The optical energy source 12 is preferably a xenon flashlamp which generates optical energy by conducting electrical current through low pressure xenon gas contained in a fused quartz tube. The pulsed optical energy output of the optical energy source 12 is controlled by a pulse modulator 20 that is energized by a power supply 22. The spectral content of the optical output of the xenon flashlamp is controlled by the current density of the plasma discharge and the pulse duration of the current applied to the flashlamp by the pulse modulator. A relatively ultraviolet rich light spectrum can be achieved by passing a short current pulse through the flashlamp. The optical energy 18 has a power density (fluence) at the target area of the surface 14 sufficient to photodecompose any adventitious organic materials present at the surface and appropriate spectral content to photodecompose the molecular bonds of the organic materials such as polymers, that make up the surface 14. However, the optical power density is not so intense as to more than insignificantly etch the surface 14. The optical power intensity at the surface of the substrate depends on the requirements of a particular application, but generally the fluence (optical power density) is within the range of about 0.01–0.5 J/cm²/sec.

In general, then, the surfaces treated in accordance with the methods of the present invention are irradiated at an intensity sufficient to photodecompose any organic surface contaminants and to break the molecular bonds of the surface of interest. However, the intensity is maintained at a level that is less than that required to significantly etch the surface of interest. For example, the output of a flashlamp may be adjusted to have a frequency of 20 Hz and a pulse width of 1.0 microsecond when the target zone of an organic surface is to be irradiated with a fluence of 0.02–0.05 J/cm²/sec. Alternatively, the flashlamp may be adjusted to have a frequency of 0.1 Hz and a pulse width of 180 microseconds when the target zone is to be irradiated with a fluence of 0.2–0.5 J/cm²/sec. Shorter optical energy pulses may be employed when it is desired to shift the output of the flashlamp towards blue light, whereas longer optical energy pulses may be used when it is desired to shift the output of the flashlamp towards red light. The choice of the longer or shorter optical energy pulses is dependent on the surfaces and the associated contaminants. The optimum pulse lengths are best found empirically for a given type of material.

By way of example, the optical energy source 12 may be implemented as a xenon flash tube constructed of a 6" long fused quartz tube having an 6 mm outside diameter and a 1 mm wall thickness, filled with xenon gas at a pressure of about 100 Torr. The manufacture and operation of flashlamps is known in the art. See e.g., U.S. Pat. No. 5,126,621, assigned to the same assignee as the present application, which patent is incorporated herein by reference.

The power supply 22 may be implemented as a Maxwell Laboratories, Inc., Model No. CCDS-825-P, power supply capable of providing 25 kV electrical power at a rate of 8 kJ/sec.

An ionized gas stream 24, which may include gaseous ions such as $N_2+$, $N+$, $O_2+$, $O+$, and $O-$ can be directed by a nozzle 25 to bathe the target area on the surface 14 with an ionized gas stream 24 received from an ionized gas generator to further enhance the surface bondability. The ionized gas generator 26 manufactures the ionized gas stream from dry gas provided by a gas supply 28 which may include dry air, ozone, chlorine, nitrogen, carbon dioxide, or ammonia. However, ozone is preferred because it is relatively easy to manufacture and readily oxidizes any photodecomposed organic molecules at the irradiated surface. The ionized gas generator may be of the type manufactured by Fischer America, Inc.

The optical energy source 12 is preferably mounted within a hood 30 that enshrouds the target area on the surface 14 being irradiated with the optical energy 18. A vacuum system 32, in fluid communication with the interior of the hood 30, collects any excess ionized gas 24 and photodecomposed organic materials liberated from the surface 14. The hood 30 also prevents ultraviolet light components generated by the optical energy source 12 from escaping into the surrounding work spaces.

In order to facilitate the irradiation of large areas with the optical energy source 12, housing 30 optionally may be supported at the end of a supporting structure 40, such as the end of an arm of a conventional robotics positioning system, so that the flashlamp may be conveniently traversed or scanned in a predetermined path over the surface 14, as would be well known by those skilled in the art.

Figure 2:
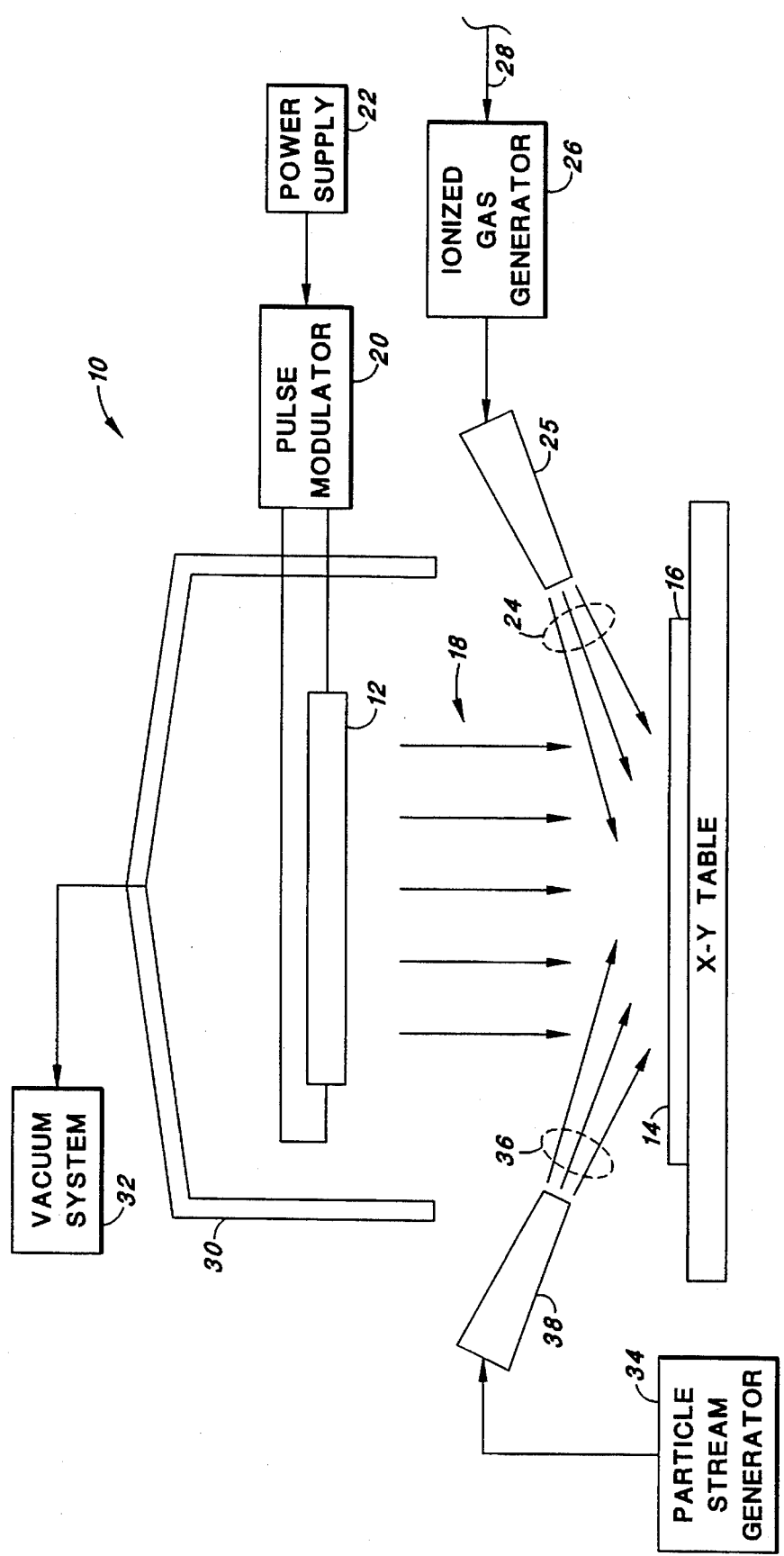
FIG. 2 is a schematic/block diagram of a system for increasing the capability of the surface of a structure to be bonded to a material which employs an X-Y table to facilitate scanning the target area of the surface with optical energy.

As an alternative to supporting the housing 30 and optical energy source 12 by the supporting structure, scanning the surface 14 of the structure 16 may also be optionally facilitated by maintaining the housing 30 stationary, and by mounting the structure 16 on a translating X-Y table 42, shown in FIG. 2. By selective manipulation of the X-Y table 42, appropriate locations on the surface of the structure 16 may be positioned within the zone of illumination of the flashlamp 12. The translating table 42 may be manually or computer controlled in accordance with well known techniques.

The nozzle 25 is also preferably mounted to the hood 30, by any suitable means (not shown). By way of example, the robotics positioning system may be implemented as a CIM-ROC 4000 Robot Controller manufactured by CimCorp Precision Systems, Inc., Shoreview, Minn.

The effectiveness of the method of the present invention for improving the bondability of the surface of an organic structure has been verified by an experiment, described below.

Experimental Results:

Thirty-two lap shear specimens of polypropylene having dimensions of 3.3"×1.5"×0.060" were cut from polypropylene sheet. The specimens were cleaned with a distilled water rinse and patted dry with Kimwipes. The samples were divided into two groups: Series 120 and Series 121. The samples of Series 12 were exposed to pulses (≈180 microseconds) of high intensity optical light at a rate of about 0.1 Hz from a linear xenon flashlamp while their irradiated surfaces were bathed in ionized air. The xenon flashlamp had a 4 mm bore and a 6 inch arc length and was filled with xenon gas at a pressure of 200 T. The input energy to the flashlamp was approximately 1000 J. The series 121 samples were each irradiated with 3 pulses in each of three zones: (1) left edge of sample below lamp; (2) middle of sample below lamp; and (3) right edge of sample below lamp. The Series 120 samples were not exposed to flashlamp radiation or ionized gas.

Pairs of samples from Series 120 were bonded together at a 1 in$^2$ area with an isocyanate based adhesive (e.g., Elmer's Superglue) to form eight test structures. Similarly, the samples of Series 12 were also bonded together to form 8 test structures. All of the samples were wetted 100 percent with adhesive when they were joined. However, it was noted that the untreated specimens of the Series 120 nearly always exhibited only about 80–90 per cent adhesive wetting at the lap joint area. The lap joint areas were placed under a two pound weight and were allowed to cure for 24 hours.

Each test structure was placed in a tensile loading fixture and subjected to tensile loading until the lap joint parted. The tension applied to the test structure was observed continuously to the point of failure. The failure tensions presented in TABLE 2 are the tensions observed just prior to lap joint failures. No deformation of the test specimens was observed during any of the tests.

The data of TABLE 2 show a doubling of the mean failure tension between the two series. The zero (0) data point for sample 1 in Series 120 represents failure (separation) of the specimen lap joint even before it was placed in the tension device. Each specimen was visually inspected after failure testing to determine the nature of the failure mechanism. In all cases the failure was observed to be adhesive rather than cohesive in nature. An adhesive failure is one in which the bonding agent ("glue") fails, whereas in a cohesive failure, the substrate separates from itself. The test results shown in TABLE 2 demonstrated that the method of the present invention of irradiating a polymeric surface with pulsed, incoherent broadband optical energy in the presence of an ionized gas greatly improves the bonding characteristics of a polymeric surface.

TABLE 2

POLYPROPYLENE SHEET LAP SHEAR TESTS

| Sample | Series 120 Failure (lbs) | Series 121 Failure (lbs) |
|---|---|---|
| 1 | 0 | 32 |
| 2 | 12 | 54 |
| 3 | 23 | 51 |
| 4 | 18 | 45 |
| 5 | 16 | 25 |
| 6 | 11 | 42 |
| 7 | 20 | 42 |
| 8 | 23 | 28 |
| Mean | 15.4 | 39.9 |
| Std. Dev. | 7.2 | 9.9 |

Series 120: No Treatment
Series 121: Samples irradiated with broadband light in the presence of ionized gas The method of the present invention may also be used to enhance the bondability of metallic surfaces, as for example, in applications such as bonding of polymeric auto-body panels to metal subpanels in the automotive industry, or painting the space shuttle fuel tanks in the aerospace industry. The types of metals, or metal alloys, with which the invention may be used to improve the bondability of their respective surfaces include, but are not limited to, aluminum, stainless steel, titanium, nickel, brass, copper, bronze, tin, and other elements or alloys that have a shiny surface, are good conductors of heat and electricity, and can be melted or fused, hammered into thin sheets, or drawn in to wires.

The preparation of a metallic surface in accordance with the methods of the present invention includes precleaning the metallic surface, e.g., by mechanically brushing or wiping the surface, to dislodge any gross inorganic contaminants present thereon. Once precleaned, the surface is then irradiated with pulsed, broadband, optical energy in order to photodecompose any organic adventitious substances yet present on the surface. The optical energy source may be the same as is described above in connection with the method of improving the bondability of the surface of an organic structure, and the same limitations on the intensity of the optical energy apply. That is, the optical energy must be of sufficient energy to photodecompose any organic adventitious substances yet present on the metallic surface, but must also be of insufficient energy to etch the surface or otherwise damage the surface. Generally, an optical fluence of between 0.01 and 0.5 J/J/cm$^2$/sec meets this requirement. The pulse width and pulse rate of the optical energy are selected to provide an appropriate energy level as described above, and are best determined empirically for a given type of metallic surface and cleaning function. Typically, the pulse width will be between 1 and 180 microseconds, and the pulse rate will be between 0.1 and 20 Hz, although other pulse widths and pulse rates may be used. The broadband optical source preferably produces optical energy having wavelengths within the range of 160 to 5000 nm.

It is noted that the precleaning step may alternatively be performed by directing a particle stream 36 through a nozzle 38 coupled to a particle stream generator 34 (which particle stream generator is shown only in FIG. 2). The particle stream, if used, may be comprised of carbon dioxide pellets. As is known, carbon dioxide is relatively inert, nontoxic, and inexpensive. The carbon dioxide pellets may be conveyed by dry, compressed air at a mass flow rate of 23 kg/hr. Such pellets are typically shaped as cylinders each having a length of about 0.5 cm and a diameter of 0.3 cm. The particle stream generator, if used, may be a carbon dioxide pellet source of the type commercially available from Cold Jet, Inc. of Loveland, Ohio.

The use of a pulsed, broadband light source reduces the processing time significantly when compared to the approach of using steady state UV light, as taught by Sowell, because of the high peak and average intensities achievable with the pulsed source.

The method of the present invention for preparing metallic surfaces may be implemented using the system 10 of FIG. 1. When the substrate 16 is a metal, the target area usually does not require exposure to ionized gas. Therefore, the ionized gas generator 26 is generally not enabled and the gas supply 28 is shut-off.

One technique that may be used to confirm that the bondability of a metal substrate has been improved by the process of the present invention is to pour distilled water over an area of the metallic surface which has been wiped clean and then irradiated as described above. The distilled water should wet the entire treated surface without any exposure of the metal surface within the perimeter of the wetted area. Such exposure would result if the distilled water were to bead up, indicting that the distilled water had a greater affinity for itself than for the metal surface. A surface which wets in this manner is referred to as a "water break free surface." Such condition occurs when the surface energy of the treated surface is higher than the surface energy of the distilled water.

Using the above-described confirmation technique, it has been shown that metallic surfaces processed in accordance with the present invention do indeed exhibit an enhanced bondability over metal surfaces not prepared in accordance with the invention. For example, aluminum surfaces have been processed using the above-described method to successfully remove organic oils, tape residue, uncatalyzed RTV (silicone rubber), salt spray and fingerprints. Once such adventitious substances were removed from the aluminum, the aluminum then exhibited a significantly enhanced surface free energy. Other metals, or metal alloys, in addition to aluminum, that may be processed using the above-described method to successfully remove organic oils, tape residue, silicone rubber, salt fingerprints, and the like in order to exhibit a significantly enhanced surface free energy include: titanium, copper, brass, stainless steel, tin, bronze, nickel, and the like.

Many of the details associated with operating and controlling the components of the system shown in FIGS. 1 and 2, especially those that relate to scanning the surface 14 with irradiation from the optical energy source 12, may be the same as, or similar to, those shown applicants' prior U.S. Pat. Nos. 5,204,517 and 5,281,798, both of which are incorporated herein by reference.

While the present invention has been described in terms of preferred embodiments, it is to be understood that the invention is not to be limited to the exact form of the apparatus or processes disclosed. Therefore, it is to be understood that the invention may be practiced other than as specifically described without departing from the scope of the claims.

What is claimed is:

1. A method for improving the capability of a surface of an organic structure to bond with another material, comprising the steps of:

generating pulsed, incoherent, broadband optical energy having a multiplicity of wavelength components which range from 160 to 5000 nanometers;

photodecomposing any adventitious organic substances on a surface of the organic structure and photodecomposing a thin layer of molecular bonds forming said surface by:

irradiating a target area of the surface of the structure with the pulsed, incoherent, broadband optical energy at a pulse rate of between 0.1 and 20 Hz, and a pulse width of from 1 to 180 microseconds, at an optical power density at the surface of the structure within the range of 0.01 to 0.5 $J/cm^2/sec$, the surface having a surface free energy, and the optical power density being of sufficient intensity to photodecompose any adventitious organic substances on the surface and to photodecompose a thin layer of molecular bonds forming the surface: and exposing the target area of the surface to ionized gas that chemically reacts with the target area of said surface to increase the surface free energy of the surface.

2. The method of claim 1 wherein the step of generating the pulsed, incoherent, broadband optical energy comprises energizing a sealed xenon flashlamp with pulses of electrical current having a width of from 1 to 180 microseconds at the pulse rate of 0.1 to 20 Hz.

3. The method of claim 2 wherein the step of irradiating the target area with the pulsed, incoherent, broadband optical energy comprises irradiating the target area at a fluence which varies no more than 15 percent over the target area.

4. The method of claim 2 wherein the step of photodecomposing any adventitious organic substances on the surface of the organic structure and photodecomposing a thin layer of molecular bonds forming the surface comprises scanning the surface in a predetermined pattern with said optical energy and said ionizing gas.

5. The method of claim 2 wherein the organic structure comprises a plastic.

6. The method of claim 2 wherein the organic structure comprises a composite material.

7. A method for improving the bondability characteristics of a metallic surface so that it exhibits an enhanced capacity to bond to another material, comprising the steps of:

precleaning the metallic surface with mechanical means to dislodge any gross inorganic substances/contaminants therefrom; and irradiating the metallic surface with pulsed, incoherent, broadband optical energy having wavelength components in the range of 160 to 5000 nanometers at an intensity sufficient to photodecompose any organic substances on said surface yet insufficient to etch the surface.

8. The method of claim 7 wherein the step of precleaning the metallic surface comprises impinging a target area on the metallic surface with a particle stream, and then scanning the metallic surface with said particle stream in order to preclean all of the metallic surface.

9. The method of claim 8 wherein the step of impinging said target area with a particle stream includes impinging said target area with frozen carbon dioxide pellets.

10. The method of claim 7 wherein the step of irradiating the metallic surface comprises irradiating a target area of the surface with optical energy generated by a xenon flashlamp energized with current pulses having a width of from 1 to 180 microseconds, at a pulse rate of between 0.1 and 20 Hz, and moving the target area over each portion of the metallic surface that is to have its bondability characteristics enhanced.

11. The method of claim 10 wherein the step of irradiating the metallic surface further includes irradiating said target area at a fluence which varies no more than 15 percent over said target area.

12. A system for improving the bondability of a surface of an organic structure to bond with a material, comprising:

an optical energy source for generating incoherent, optical energy having wavelength components ranging from 160 to 5000 nanometers;

a pulse modulator operably coupled to control said optical energy source so that the optical energy generated by the optical energy source may be varied by pulsing the optical energy to have a pulse width of from 1 to 180 microseconds and a pulse rate of from 0.1 to 20 Hz;

an electrical power supply operably coupled to power said pulse modulator;

means for irradiating the surface with optical energy generated by the optical energy source so that the intensity of the optical energy at a target area on the surface is within the range of 0.05 to 0.5 $J/cm^2/sec$, which energy is sufficient to photodecompose any organic substances on the surface yet is insufficient to etch the surface; and a source of ionized gas positioned to bath the irradiated target area with an ionized gas as it is irradiated with the pulsed, incoherent, optical energy.

13. The system of claim 12 further including:

a hood for supporting the optical energy source and for enshrouding the irradiated surface to capture a substantial amount of any photodecomposed molecules liberated from the surface; and a vacuum system coupled to collect said photodecomposed molecules captured by said hood.

14. The system of claim 13 further including a translatable supporting structure for supporting said hood to facilitate scanning said structure with said optical energy source and said ionized gas.

15. The system of claim 13 further including an X-Y table on which said structure is supported in order to facilitate scanning said structure with said optical energy source and said ionized gas.

16. The system of claim 13 wherein said organic structure is selected from the group comprising plastics and composites.

17. A system for improving the bondability of a metallic surface of a metallic substance comprising:

precleaning means for dislodging any gross inorganic contaminants present on the metallic surface;

optical energy source means for generating pulsed, broadband, incoherent, optical energy having wavelength components ranging from 160 to 5000 nanometers;

a power supply operably coupled to power said pulse modulator; and irradiating means for directing said pulsed optical energy to irradiate said surface of said metallic surface at an intensity sufficient to photodecompose any organic adventitious substances present on the metallic surface, yet insufficient to etch said metallic surface.

18. The system of claim 17 wherein the metallic substance is selected from the group comprising aluminum, copper, tin, nickel, brass, steel, bronze and titanium.

* * * * *